United States Patent
Boertjes et al.

(10) Patent No.: US 7,340,174 B2
(45) Date of Patent: Mar. 4, 2008

(54) PROGRAMMABLE OADM WITH CHROMATIC DISPERSION, DISPERSION SLOPE AND AMPLITUDE RIPPLE COMPENSATION, AND METHOD

(75) Inventors: David W. Boertjes, Nepean (CA); Mark R. Hinds, Ottawa (CA); Kieran J. Parsons, Ottawa (CA); Simon Parry, Harlow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 711 days.

(21) Appl. No.: 10/029,282

(22) Filed: Dec. 28, 2001

(65) Prior Publication Data

US 2003/0123880 A1    Jul. 3, 2003

(51) Int. Cl.
*H04J 14/02* (2006.01)
(52) U.S. Cl. .......................... 398/81; 398/83; 398/147
(58) Field of Classification Search ............ 398/48–50, 398/55, 56, 81, 147–150, 158, 159, 192, 398/194, 83
See application file for complete search history.

(56) References Cited

U.S. PATENT DOCUMENTS

| | | | | |
|---|---|---|---|---|
| 5,602,666 A | * | 2/1997 | Ishikawa et al. | 398/159 |
| 5,959,749 A | * | 9/1999 | Danagher et al. | 398/83 |
| 6,005,702 A | * | 12/1999 | Suzuki et al. | 398/185 |
| 6,043,914 A | | 3/2000 | Cook et al. | 359/124 |
| 6,084,694 A | | 7/2000 | Milton et al. | 359/124 |
| 6,137,604 A | | 10/2000 | Bergano | 359/124 |
| 6,169,616 B1 | * | 1/2001 | Cao | 398/9 |
| 6,344,912 B1 | * | 2/2002 | Hajjar et al. | 398/48 |
| 6,441,955 B1 | * | 8/2002 | Takatsu et al. | 359/341.4 |
| 6,445,850 B1 | | 9/2002 | Zhou et al. | |

(Continued)

FOREIGN PATENT DOCUMENTS

EP    1043859    4/2000

(Continued)

OTHER PUBLICATIONS

"Hybrid thin film WDM and optical switch devices for optical add/drop", Scobey, M. and Hallock, R., Optical Fiber Communication Conference, 2000, Mar. 7-10, 2000, Baltimore, MD, US, vol. 2, p. 335-337.

(Continued)

*Primary Examiner*—Christina Leung
(74) *Attorney, Agent, or Firm*—Borden Ladner Gervais LLP

(57) ABSTRACT

A programmable optical add/drop multiplexer (OADM) implements add/drop function of optical signals from a number of cross-connected optical systems while treating issues of coherent cross-talk, chromatic dispersion, slope of dispersion and amplitude equalization. Input WDM (wavelength division multiplexed) optical signals from a number of optical systems are each de-multiplexed into a number of optical path signal that are routed through switches and then multiplexed into a number of output WDM optical signals. Problems with coherent cross-talk in optical path signals are eliminated by introducing equivalent optical path lengths between paths through which the optical path signals propagate and by introducing dead-bands between consecutive optical path signals. Chromatic dispersion, slope of dispersion and amplitude equalization compensation provide common values of chromatic dispersion, slope of dispersion and power for respective optical path signals at the switches and provide respective target values, at outputs, satisfying transmission requirements of a respective optical system.

24 Claims, 3 Drawing Sheets

U.S. PATENT DOCUMENTS

| | | | |
|---|---|---|---|
| 6,493,117 B1 | 12/2002 | Milton et al. | 359/124 |
| 6,519,060 B1 * | 2/2003 | Liu | 398/49 |
| 6,529,300 B1 | 3/2003 | Milton et al. | 359/119 |
| 6,714,702 B2 | 3/2004 | Whiteaway et al. | |
| 2002/0186432 A1 * | 12/2002 | Roorda et al. | 359/128 |

FOREIGN PATENT DOCUMENTS

| | | |
|---|---|---|
| EP | 1100217 | 8/2000 |
| FR | 2779891 | 3/1999 |
| WO | 0049752 | 8/2000 |
| WO | 0057590 | 9/2000 |

OTHER PUBLICATIONS

Von Manfred Rocks, Ralf Th. Kersten, "Optische Multiplex-Systeme in der optischen Nachrichtentechnik" Frequenz, vol. 36, 1982, Dez. No. 12, Berlin, Deutschland, XP-000797023, pp. 319-327.

* cited by examiner

| WDM GROUP | CHANNEL NUMBER | F (THz) | λ (nm) | |
|---|---|---|---|---|
| 1 | 1 | 196.200 | 1527.994 | 201 |
| | 2 | 196.100 | 1528.773 | |
| | 3 | 196.000 | 1529.553 | |
| | 4 | 195.900 | 1530.334 | |
| | | 195.800 | 1531.116 | 211 |
| | | 195.700 | 1531.898 | |
| 2 | 5 | 195.600 | 1532.681 | 202 |
| | 6 | 195.500 | 1533.465 | |
| | 7 | 195.400 | 1534.250 | |
| | 8 | 195.300 | 1535.036 | |
| | | 195.200 | 1535.822 | 212 |
| | | 195.100 | 1536.609 | |
| 3 | 9 | 195.000 | 1537.397 | 203 |
| | 10 | 194.900 | 1538.186 | |
| | 11 | 194.800 | 1538.976 | |
| | 12 | 194.700 | 1539.766 | |
| | | 194.600 | 1540.557 | 213 |
| | | 194.500 | 1541.349 | |
| 4 | 13 | 194.400 | 1542.142 | 204 |
| | 14 | 194.300 | 1542.936 | |
| | 15 | 194.200 | 1543.730 | |
| | 16 | 194.100 | 1544.526 | |
| | | 194.000 | 1545.322 | 214 |
| | | 193.900 | 1546.119 | |
| | | 193.800 | 1546.917 | |
| | | 193.700 | 1547.715 | |
| 5 | 17 | 193.600 | 1548.515 | 205 |
| | 18 | 193.500 | 1549.315 | |
| | 19 | 193.400 | 1550.116 | |
| | 20 | 193.300 | 1550.918 | |
| | | 193.200 | 1551.721 | 215 |
| | | 193.100 | 1552.524 | |
| 6 | 21 | 193.000 | 1553.329 | 206 |
| | 22 | 192.900 | 1554.134 | |
| | 23 | 192.800 | 1554.940 | |
| | 24 | 192.700 | 1555.747 | |
| | | 192.600 | 1556.555 | 216 |
| | | 192.500 | 1557.363 | |
| 7 | 25 | 192.400 | 1558.173 | 207 |
| | 26 | 192.300 | 1558.983 | |
| | 27 | 192.200 | 1559.794 | |
| | 28 | 192.100 | 1560.606 | |
| | | 192.000 | 1561.419 | 217 |
| | | 191.900 | 1562.233 | |
| 8 | 29 | 191.800 | 1563.047 | 208 |
| | 30 | 191.700 | 1563.863 | |
| | 31 | 191.600 | 1564.679 | |
| | 32 | 191.500 | 1565.496 | |

200 — xC-BAND

32 OADM CHANNELS WITH 32 TOTAL CHANNELS

FIG.2A

PROGRAMMABLE OADM WITH CHROMATIC DISPERSION, DISPERSION SLOPE AND AMPLITUDE RIPPLE COMPENSATION, AND METHOD

FIELD OF THE INVENTION

The invention relates to the field of optical networks. More specifically the invention pertains to optical add/drop multiplexing.

BACKGROUND OF THE INVENTION

Optical add/drop multiplexers (OADMs) are widely used in optical networks. OADMs can be used to provide local termination of traffic and optical cross-connect of multiple optical systems. The main problem in cross-connecting long-haul optical systems include coherent cross-talk (or multi-path interference (MPI)), amplitude equalization and chromatic dispersion. These issues become increasingly problematic in high bit rate applications. Multiple cascaded three-port filters are commonplace, but filter isolation is not absolute and therefore they introduce MPI. The MPI is introduced through a "reflective" express path on which the non-add/drop traffic is routed. Tunable filters are sometimes used but are, in general, unable to be reconfigured without affecting some other traffic on the line other than that being switched.

SUMMARY OF THE INVENTION

A programmable optical add/drop multiplexer (OADM) implements an add/drop function of optical signals from a number of cross-connected optical systems while treating issues of coherent cross-talk (or multi-path interference (MPI)), chromatic dispersion, slope of dispersion and amplitude equalization. Input WDM (wavelength division multiplexed) optical signals from a number of optical systems are each demultiplexed into a number of optical path signals that are routed through optical switches and then multiplexed into a number of output WDM optical signals. Problems with coherent cross-talk in optical path signals (or equivalently, MPI) are eliminated by introducing equivalent optical path lengths between paths through which the optical path signals propagate and by introducing dead-bands between consecutive optical path signals. Chromatic dispersion, slope of dispersion and amplitude equalization compensation is performed such that at the optical switches respective ones of the optical path signals have a common value of chromatic dispersion, slope of dispersion and power. Chromatic dispersion, slope of dispersion and amplitude equalization compensation is also performed for each one of the output WDM optical signals such that the chromatic dispersion, slope of dispersion and power are set to respective target values satisfying transmission requirements of a respective optical system. In addition, the target values are independent of which optical path signals are being added and dropped.

In accordance with one broad aspect of the invention, the invention provides a method of implementing programmable optical add/drop multiplexing. In the method, for each one of N optical systems, a respective input WDM optical signal is de-multiplexed into a plurality of optical path signals each having at least one channel. An add/drop function is then performed on selected ones of the optical path signals and through paths are established for remaining ones of the optical path signals. In the method, for each one of the N optical systems, a plurality of optical path signals are multiplexed into an output WDM optical signal. Furthermore, at least one of chromatic dispersion compensation, slope of dispersion compensation and amplitude compensation is performed. The chromatic dispersion compensation results in, for each one of the N optical systems, the chromatic dispersion of a respective one of the output WDM optical signals being independent of the add/drop function and corresponding to a target value. The slope of dispersion results in, for each one of the N optical systems, the slope of dispersion of a respective one of the output WDM optical signals being independent of the add/drop function and corresponding to a target value. The amplitude compensation results in, for each one of the N optical systems, the amplitude of a respective one of the output WDM optical signals being independent of the add/drop function and corresponding to a target value.

Another broad aspect of the invention provides a method of implementing programmable optical add/drop multiplexing. The method includes de-multiplexing, for each one of N optical systems, a respective input WDM optical signal. The respective input WDM optical signals may be fully de-multiplexed into a plurality of optical path signals each having one channel or partially de-multiplexed into a plurality of optical path signals with at least one of the optical path signals having a plurality of channels. The method includes performing an add/drop function of selected ones of the optical path signals and establish through paths of remaining ones of the optical path signals. The method includes multiplexing, for each one of the N optical systems, a plurality of optical path signals into an output WDM optical signal.

Another broad aspect of the invention provides a method of implementing programmable optical add/drop multiplexing. The method includes de-multiplexing, for each one of N optical systems, a respective input WDM optical signal. The respective input WDM optical signals may be fully de-multiplexed into a plurality of optical path signals each having one channel or partially de-multiplexed into a plurality of optical path signals with at least one of the optical path signals having a plurality of channels. The method includes performing an add/drop function of selected ones of the optical path signals and establish through paths of remaining ones of the optical path signals. The method includes multiplexing, for each one of the N optical systems, a plurality of optical path signals into an output WDM optical signal. The method also includes establishing two or more paths of approximately equal optical path lengths between the de-multiplexing and the multiplexing.

The method may be applied to optical systems in which input WDM optical signals have dead-bands such that when the input WDM optical signals are de-multiplexed the dead bands may be included between concurrent optical path signals of the N optical systems. This may result in mitigation of filtering penalties in de-multiplexing the input WDM optical signals and a reduction of effects of cross-talk between the concurrent optical path signals.

The method may include performing chromatic dispersion compensation. The process of chromatic dispersion compensation may result in each one of the output WDM optical signals of the N optical systems having a chromatic dispersion set to a target value which is suitable for transmission requirements of a respective one of the N optical systems. In addition, the chromatic dispersion may be independent of the optical path signals being added and dropped.

In some embodiments, the chromatic dispersion compensation may include performing preliminary chromatic dispersion compensation and slope of dispersion compensation, for each one of the input WDM optical signals of the N optical systems. This may be done such that the input WDM optical signals are set to common values of chromatic dispersion and slope of dispersion, respectively. Output chromatic dispersion compensation and slope of dispersion compensation of one or more of the output WDM optical signals of the N optical systems may also be performed. In this case, for the one or more of the output WDM optical signals of N optical systems, the chromatic dispersion and the slope of dispersion may be set to target values of chromatic dispersion and slope of dispersion, respectively. These target values may be suitable for transmission requirements of a respective one of the N optical systems. In some embodiments, secondary chromatic dispersion and slope of dispersion compensation may be performed for at least one optical path signal of each one of at least N−1 optical systems of the N optical systems. This may be done such that respective optical path signals of the at least N−1 optical systems may be set to have common values of chromatic dispersion and slope of dispersion, respectively. More particularly, optical path signals at a particular switch may have common values of chromatic dispersion and slope of dispersion. In other embodiments, secondary chromatic dispersion and slope of dispersion compensation may be performed for at least one optical path signal of each one of the input WDM optical signals of the N optical systems. This may be done so that the chromatic dispersions and slopes of dispersion of at least one optical path signal of each one of the input WDM optical signals may be set to common values of chromatic dispersion and slope of dispersion, respectively.

In some embodiments, the method may include performing amplitude compensation. This may be done so that the power of the output WDM optical signals corresponds to target values that may be suitable for transmission requirements of a respective one of the N optical systems. Furthermore the power may be independent of the optical path signals being added and dropped. The amplitude compensation may include performing amplification of each one of the input WDM optical signals of the N optical systems such that the power of each one of the input WDM optical signals of the N optical systems may be set to a common value. The amplitude compensation may also include performing amplification of each one of the output WDM optical signals of the N optical systems. This may be done so that the powers of the output WDM optical signals may be set to target values which are suitable for transmission requirements of respective ones of the N optical systems. Finally, the amplitude compensation may include performing amplitude compensation through amplification and/or attenuation of the optical path signals of the N optical systems such that, for respective ones of the optical path signals of the N optical systems, the power may be set to a specific common value.

Another broad aspect of the invention provides a programmable optical add/drop multiplexer (OADM). The programmable OADM includes two or more OADM elements. Each one of the OADM elements has a de-multiplexer (DeMUX) and a multiplexer (MUX) connected through a plurality of paths. Each one of the DeMUXs is used to de-multiplex an input WDM optical signal into a plurality of optical path signals and each one of the optical path signals propagates through a respective one of the paths. Each one of the MUXs is used to multiplex a plurality of optical path signals into an output WDM optical signal. A plurality of switches are each connected to respective ones of the paths of the two or more OADM elements. The switches are used to perform an add/drop function of selected ones of the optical path signals of the two or more OADM elements and to establish through paths of remaining ones of the optical path signals of the two or more OADM elements. The programmable has at least one of a plurality of dispersion and slope of dispersion compensation modules (DSCMs), a plurality of optical amplifiers and a plurality of variable gain control elements (VGCEs). The DSCMs are used to perform at least one of dispersion compensation and slope of dispersion compensation in a manner that, for each one of the two or more OADM elements, the dispersion and slope of dispersion, respectively, of the output WDM optical signal is independent of the state of the switches. Furthermore, the optical amplifiers and the VGCEs are used to perform amplitude compensation in a manner that, for each one of the two or more OADM elements, the amplitude of the output WDM optical signal is independent of the state of the switches.

Another broad aspect of the invention provides an optical system. Within the optical system there is at least one transmitter that is used to generate optical signals each comprising one or more channel wherein channel frequencies at which the optical signals are generated are limited to provide dead-bands. The optical system also has a programmable OADM. The programmable OADM has two or more OADM elements. Each one of the OADM elements has a DeMUX and a MUX connected through a plurality of paths, wherein the DeMUX is adapted to de-multiplex an input WDM optical signal into a plurality of optical path signals. The input WDM optical signal carries dead-bands and when the input WDM optical signal is de-multiplexed least one of the dead-bands within input WDM optical signal between at least two of the optical path signals. Each one of the optical path signals propagates through a respective one of the paths. Furthermore, each one of the MUXs is adapted to multiplex a plurality of optical path signals into an output WDM optical signal. A plurality of switches are each connected to respective ones of the paths of the two or more OADM elements. The switches are used to perform add/drop function of selected ones of the optical path signals of the two or more OADM elements and to establish through paths of remaining ones of the optical path signals of the two or more OADM elements.

Another broad aspect of the invention provides a programmable OADM that has two or more OADM elements. Each one of the OADM elements has a DeMUX and a MUX. They are connected through a number of paths such that the DeMUX de-multiplexes an input WDM optical signal into a plurality of optical path signals each propagating through a respective one of the paths. Each one of the MUXs multiplexes a plurality of optical path signals into an output WDM optical signal. The programmable OADM includes a plurality of switches each connected to respective ones of the paths of the two or more OADM elements. The switches perform an add/drop function of selected ones of the optical path signals of the two optical systems and establish through paths of remaining ones of the optical path signals of the two optical systems. The programmable OADM also has optical path length means for reducing effects of coherent cross-talk between the optical path signals.

The programmable OADM may also have any one or more of chromatic dispersion means, slope of dispersion means and amplitude compensation means to assure that the chromatic dispersion, slope of dispersion, and amplitude, respectively, of the output WDM optical signals are independent of the state of the switches and set to respective target values.

To summarize, the programmable OADM implements add/drop function of optical signals from a number of cross-connected optical systems while concurrently treating issues of coherent cross-talk, chromatic dispersion, slope of dispersion and amplitude equalization.

BRIEF DESCRIPTION OF THE DRAWINGS

Preferred embodiments of the invention will now be described with reference to the attached drawings in which:

FIG. 2A is a list describing one way an input WDM (wavelength division multiplexed) optical signal is partially de-multiplexed into a number of partially de-multiplexed optical path signals.

DETAILED DESCRIPTION OF THE PREFERRED EMBODIMENTS

Figure 1:
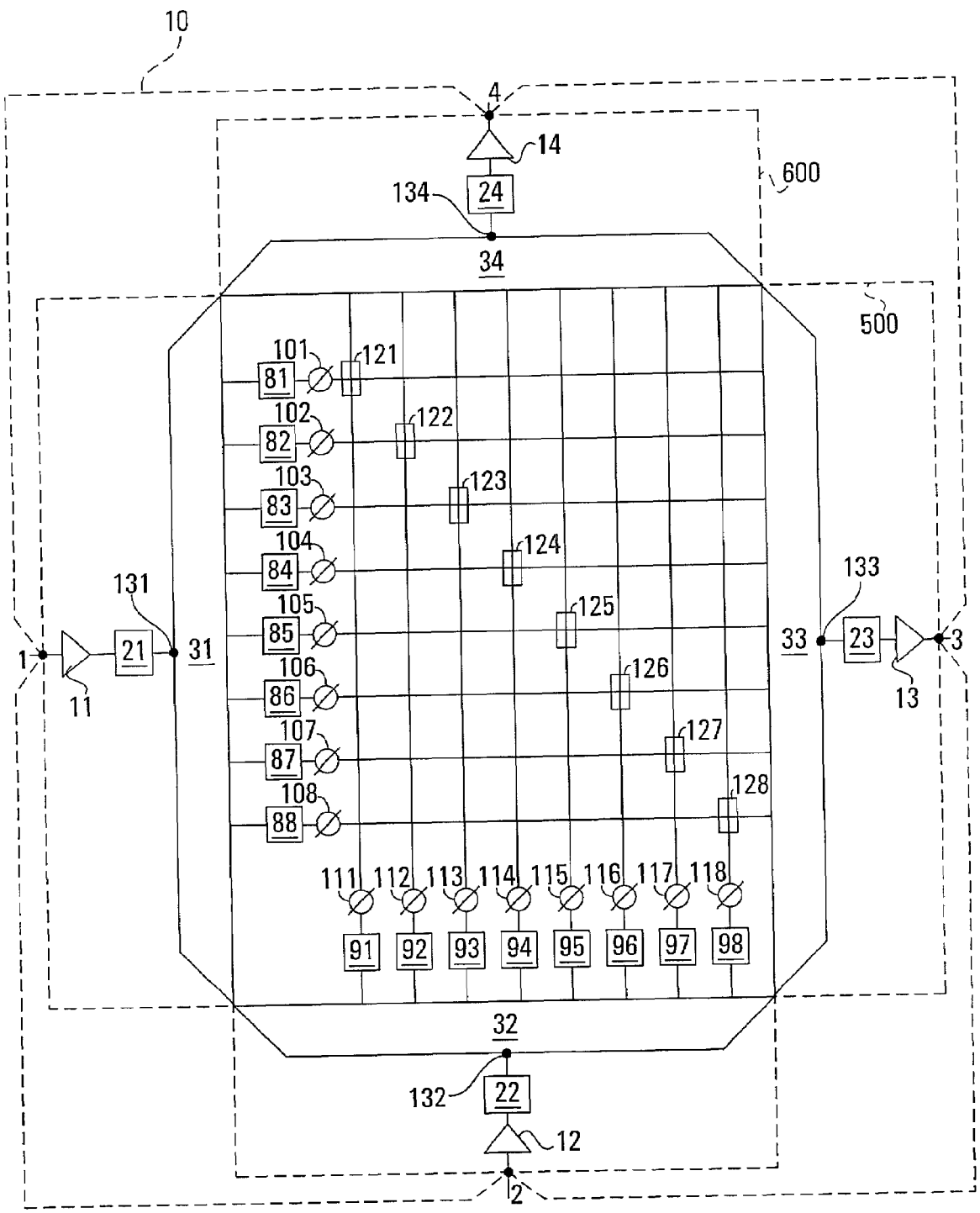
FIG. 1 is a block diagram of a programmable optical add/drop multiplexer (OADM), provided by an embodiment of the invention.

Referring to FIG. 1, shown is a block diagram of a programmable optical add/drop multiplexer (OADM) 10, provided by an embodiment of the invention. The programmable OADM 10 of FIG. 1 is an arrangement of optical amplifiers, dispersion and slope compensation modules (DSCMs), multiplexers (MUX), de-multiplexers (DeMUX), variable gain control elements (which can be amplifiers, attenuators or both) and optical switches. The preferred embodiment of FIG. 1 is used to perform optical add/drop multiplexing of WDM (wavelength division multiplexed) optical signals between two optical systems.

An input optical amplifier 11 is connected to an input 1 of the programmable OADM 10 and to a primary DSCM 21. Preferably, the primary DSCM 21 is a broadband DSCM. The primary DSCM 21 is connected to an input 131 of a DeMUX 31. The DeMUX 31 and a MUX 33 form a MUX/DeMUX pair connected through eight paths. In a preferred embodiment of the invention, the DeMUX 31 and the MUX 33 are both optical wavelength division multiplexing filters. Each path includes a respective one of eight secondary DSCMs 81, 82, 83, 84, 85, 86, 87 and 88, a respective one of eight variable gain control elements (VGCEs) 101, 102, 103, 104, 105, 106, 107 and 108, and a respective one of eight optical switches 121, 122, 123, 124, 125, 126, 127 and 128. In a preferred embodiment of the invention, the secondary DSCMs 81 to 88 are narrow-band DSCMs and the optical switches 121 to 128 are 2×2 optical switches. An output 133 of the MUX 33 is connected to an output DSCM 23 and the output DSCM 23 is connected to an output optical amplifier 13. The output optical amplifier 13 is connected to an output 3 of the programmable OADM 10. The input 1, the input optical amplifier 11, the primary DSCM 21, the DeMUX 31, the secondary DSCMs 81 to 88, the VGCEs 101 to 108, the MUX 33, the output DSCM 23, the output optical amplifier 13 and the output 3 form an OADM element 500.

An input optical amplifier 12 is connected to an input 2 of the programmable OADM 10 and to a primary DSCM 22. Preferably, the primary DSCM 22 is a broadband DSCM. The primary DSCM 22 is connected to an input 132 of a DeMUX 32. The DeMUX 32 and a MUX 34 form a MUX/DeMUX pair connected through eight paths. In a preferred embodiment of the invention, the DeMUX 32 and the MUX 34 are both optical wavelength division multiplexing filters. Each path includes a respective one of eight secondary DSCMs 91, 92, 93, 94, 95, 96, 97 and 98, a respective one of eight variable gain control elements (VGCEs) 111, 112, 113, 114, 115, 116, 117 and 118, and a respective one of the optical switches 121, 122, 123, 124, 125, 126, 127 and 128. In a preferred embodiment of the invention, the secondary DSCMs 91 to 98 are narrow-band DSCMs. An output 134 of the MUX 34 is connected to an output DSCM 24 and the output DSCM 24 is connected to an output optical amplifier 14. The output optical amplifier 14 is connected to an output 4 of the programmable OADM 10. The input 2, the input optical amplifier 12, the primary DSCM 22, the DeMUX 32, the secondary DSCMs 91 to 98, the VGCEs 111 to 118, the MUX 34, the output DSCM 24, the output optical amplifier 14 and the output 4 form an OADM element 600.

The programmable OADM 10 features add/drop functions for adding and dropping channels between two optical systems. In adding and dropping channels between the two optical systems, a number of problems such as coherent cross-talk (or multi-path interference (MPI)), chromatic dispersion and amplitude equalization must be treated; 1) Coherent cross-talk may occur during channel filtering processes at the DeMUXs 31, 32 and the MUXs 33, 34. More particularly, an input WDM optical signal which is de-multiplexed by one of the DeMUXs 31, 32 results in paths signal propagating through respective paths to one of the MUXs 33, 34. In de-multiplexing, frequency leakage from one of the respective paths into other ones of the respective paths may occur causing coherent cross-talk at the MUXs 33, 34 where optical path signals are being multiplexed into output WDM optical signals. When the respective paths have different optical path lengths the coherent cross-talk due to the frequency leakage may compromise the integrity of the output WDM optical signals. 2) Chromatic dispersion of an optical signal depends on the length over which the optical signal has traveled. Therefore, for example, two input WDM optical signals at inputs 1 and 2 may have different chromatic dispersions. The programmable OADM 10 must therefore compensate for mismatches in chromatic dispersion of input WDM optical signals when cross-connecting optical systems. 3) In addition, chromatic dispersion is wavelength dependent, resulting in a slope of dispersion. The slope of dispersion is specific to the type of optical fiber through which an WDM optical signal propagates. The programmable OADM 10 must therefore also compensate for any mismatches in slope of dispersion when cross-connecting optical systems with different optical fibers through which respective WDM optical signals propagate. 4) Finally, WDM optical signals from different optical systems may be at different amplification stages at the point where the cross-connections occur. The programmable OADM 10 must therefore compensate for mismatches in the power spectrum and perform amplitude equalization. The programmable OADM 10 implements add/drop functions while treating the issues of coherent cross-talk, chromatic dispersion, slope of dispersion and amplitude equalization.

An input WDM optical signal from a first optical system is input at the input 1 of the programmable OADM 10 and propagates to the input optical amplifier 11 where it is amplified. The input WDM optical signal from the first optical system then propagates to the primary DSCM 21. The primary DSCM 21 performs preliminary chromatic dispersion and slope of dispersion compensation of the input WDM optical signal from the first optical system. The input WDM optical signal from the first optical system then propagates to the DeMUX 31 where it is de-multiplexed into eight optical path signals from the first optical system such that each one of the eight optical path signals from the first optical system includes four channels. In a preferred embodiment of the invention, an input WDM optical signal is partially de-multiplexed into a number of optical path signals meaning that at least one of the optical path signals is a WDM optical path signal having more than one channel associated with it. In another embodiment of the invention, an input WDM optical signal is fully de-multiplexed into a number of single channel optical path signals. Referring back to FIG. 1, each one of the eight optical path signals propagates to a respective one of the secondary DSCMs 81 to 88. Each one of the secondary DSCMs 81 to 88 performs secondary chromatic dispersion and slope of dispersion compensation over its respective optical path signal. Each one of the eight optical path signals from the first optical system then propagates to a respective one of the VGCEs 101 to 108. Each one of the VGCEs 101 to 108 performs amplitude equalization over its respective optical path signal. Each one of the eight optical path signals from the first optical system then propagates to a respective one of the optical switches 121 to 128.

Similarly, an input WDM optical signal from a second optical system is input at the input 2 of the programmable OADM 10 and propagates to the input optical amplifier 12 where it is amplified. The input WDM optical signal from the second optical system then propagates to the primary DSCM 22. The primary DSCM 22 performs preliminary chromatic dispersion and slope of dispersion compensation over the input WDM optical signal from the second optical system. The input WDM optical signal from the second optical system then propagates to the DeMUX 32 where it is de-multiplexed into eight optical path signals from the second optical system such that each one of the eight optical path signals from the second optical system includes four channels. Each one of the eight optical path signals from the second optical system propagates to a respective one of the secondary DSCMs 91 to 98. Each one of the secondary DSCMs 91 to 98 performs secondary chromatic dispersion and slope of dispersion compensation over its respective optical path signal. Each one of the eight optical path signals from the second optical system then propagates to a respective one of the VGCEs 111 to 118. Each one of the VGCEs 111 to 118 performs amplitude equalization over its respective optical path signal. Each one of the eight optical path signals from the second optical system then propagates to a respective one of the optical switches 121 to 128.

Each one of the optical switches 121 to 128 is used to perform the add/drop function or establish through paths. In its "bar" state, any one of the optical switches 121 to 128 forms a through path and routes its respective optical path signals from the DeMUXs 31 and 32 to the MUXs 33 and 34, respectively. In its "cross" state, any one of the optical switches 121 to 128 performs an add/drop function by routing its respective optical path signals from the DeMUXs 31 and 32 to the MUXs 34 and 33, respectively.

Depending on the state of the optical switches 121 to 128, some of the optical path signals from both the first and second optical systems are multiplexed, at the MUX 33, into a first output WDM optical signal. The first output WDM optical signal is output at the output 133 of the MUX 33 and propagates to the output DSCM 23. The output DSCM 23 performs output chromatic dispersion and slope of dispersion compensation over the first output WDM optical signal. The first output WDM optical signal then propagates to the output optical amplifier 13 where it is amplified and it is then output at the output 3 of the programmable OADM 10.

Depending on the state of the optical switches 121 to 128, some of the optical path signals from both the first and second optical systems are multiplexed, at the MUX 34, into a second output WDM optical signal. The second output WDM optical signal is output at the output 134 of the MUX 34 and propagates to the output DSCM 24. The output DSCM 24 performs output chromatic dispersion and slope of dispersion compensation over the second output WDM optical signal. The second output WDM optical signal then propagates to the output optical amplifier 14 where it is amplified and it is then output at the output 4 of the programmable OADM 10.

The programmable OADM 10 is not limited to cross-connection between two optical systems. In another embodiment of the invention, the programmable OADM 10 is a cross-connection of N optical systems. Furthermore, in some cases the N optical systems form parts of a single optical system. The cross-connection of N optical systems includes N OADM elements, which are similar to the OADM elements 500 and 600, cross-connected by a number of N×N switches.

Amplitude Compensation

At outputs 3 and 4, the first and second output WDM optical signals, respectively, require specific target values of power that are suitable for transmission requirements of a respective one of the first and second optical systems. The input amplifiers 11 and 12 amplify the input WDM optical signals from the first and second optical systems, respectively, such that both input WDM optical signals have a common value of power. Although the powers of the input WDM optical signals are equalized, due to wavelength dependent amplitude ripple, respective channels of the input WDM optical signals from the first and second optical system may have different powers. Equivalently, two optical path signals of the optical path signals from the first optical system may not have the same power. Similarly, two optical path signals of the optical path signals from the second optical system may not have the same power. Consequently, the VGCEs 101 to 108 and VGCEs 111 to 118 perform amplitude equalization of the optical path signals from the first and second optical system, respectively, such that the optical path signals all have a common value of power. Each one of optical path signals from the first and second optical system is multiplexed through one of the MUXs 33 and 34 resulting in the first and second output WDM optical signals, respectively. The output amplifiers 13 and 14 amplify the first and second output WDM optical signals, respectively, such that the power of each one of the first and second output WDM optical signals is set to a target value which is suitable for transmission requirements of a respective one of the first and second optical systems.

In the preferred embodiment of FIG. 1, all paths between a MUX/DeMUX pair have a VGCE connected between a DSCM and an optical switch (or equivalently, between a DeMUX and an optical switch). For example, the VGCE 101 is connected between the DSCM 81 and the optical switch 121 (or equivalently, between the DeMUX 31 and the optical switch 121). In another embodiment of the invention one or more MUX/DeMUX pairs have one or more paths in which a VGCE is connected between an optical switch and a MUX. For example, in another embodiment of the invention, the VGCE 101 is connected between the optical switch 121 and the MUX 33. In this other embodiment of the invention, the VGCE 101 provides a mute function for a respective one of the optical path signals from either the first or second optical system, depending on the state of the optical switch 121.

Chromatic Dispersion and Slope of Dispersion Compensation

At outputs 3 and 4, the first and second output WDM optical signals, respectively, are required to have specific target values of chromatic dispersion and slope of dispersion that are suitable for transmission requirements of a respective one of the first and second optical systems. These requirements must be met irrespective of the state of the optical switches 121 to 128. This is achieved by assuring that at the optical switches 121 to 128 the optical path signals from the first and second optical systems have a common chromatic dispersion and common slope of dispersion. The primary DSCMs 21 and 22 perform preliminary chromatic dispersion and slope of dispersion compensation over the input WDM optical signals from the first and second optical system, respectively, such that the input WDM optical signals from the first and second optical system have common values of chromatic dispersion and slope of dispersion. In the preferred embodiment of FIG. 1, although the primary DSCMs 21 and 22 perform preliminary chromatic dispersion and slope of dispersion compensation, the values of chromatic dispersion and slope of dispersion of the optical path signals from the first optical system are only roughly equal to respective ones from the second optical system. Consequently, the secondary DSCMs 81 to 88 and the secondary DSCMs 91 to 98 are used to perform chromatic dispersion and slope of dispersion compensation over the optical path signals from the first and second optical system, respectively, such that the optical path signals from the first and second optical system have common values of chromatic dispersion and slope of dispersion. Each one of optical path signals from the first and second optical system is multiplexed through one of the MUXs 33 and 34 resulting in the first and second output WDM optical signals, respectively. The output DSCMs 23 and 24 perform output chromatic dispersion and slope of dispersion compensation over the first and second output WDM optical signals, respectively, such that each one of the first and second output WDM optical signals has values of chromatic dispersion and slope of dispersion equal to a respective one of the target values of chromatic dispersion and slope of dispersion.

In a preferred embodiment of the invention, the primary DSCMs 21 and 22, the secondary DSCMs 81 to 88 and 91 to 98 are chosen such that the common values of dispersion and slope of dispersion are equal to an average of the target values dispersion and slope of dispersion, respectively, of the first and second output WDM optical signals at outputs 3 and 4, respectively. A common value for the chromatic dispersion or slope of dispersion which is equal to the average of the respective target values of chromatic dispersion or slope of dispersion, respectively, at outputs 3 and 4 is not essential and other respective common values are suitable.

In a preferred embodiment of the invention, the primary DSCMs 21 and 22 are broadband DSCMs performing preliminary chromatic dispersion and slope of dispersion compensation and the secondary DSCMs 81 to 88 and 91 to 98 are narrow-band DSCMs performing secondary chromatic dispersion and slope of dispersion compensation. In another embodiment of the invention, the accuracy of the primary DSCMs 21 and 22 and the output DSCMs 23 and 24 is high enough such that secondary chromatic dispersion and slope of dispersion compensation is not required. In this other embodiment of the invention the secondary DSCMs 81 to 88 and 91 to 98 are not present. In some cases required target values of chromatic dispersion and slope of dispersion at the output 3 are the same as target values of chromatic dispersion and slope of dispersion at the output 4. In such cases the common values of chromatic dispersion and slope of dispersion are set to the required target values of chromatic dispersion and slope of dispersion, respectively, at the output 3 and the output 4 and there is no need for the output DSCMs 23 and 24. Consequently, in yet another embodiment of the invention the output DSCMs 23 and 24 are not present.

In another embodiment of the invention the optical path signals from the first and second optical systems are set to common values of chromatic dispersion and slope of dispersion in a single step by performing secondary chromatic dispersion and slope of dispersion only. In this other embodiment of the invention, the primary DSCMs 21 and 22 are not present and the secondary DSCMs 81 to 88 and 91 to 98 are broadband DSCMs.

In some instances slope of dispersion of the output signals at the outputs 3 and 4 is not crucial and only one of the two OADM elements 500 and 600 includes secondary DSCMs. For example, in another embodiment the secondary DSCMs 81 to 88 are not present. In this other embodiment, the secondary DSCMs 91 to 98 apply secondary chromatic dispersion and slope of dispersion compensation to a respective one of the optical path signals from the second optical system such that respective ones of the optical path signals from the first and second optical system have common values of chromatic dispersion and slope of dispersion which are specific to the respective ones of the optical path signals (or equivalently, specific to each one of the switches 121 to 128).

In an embodiment that has N OADM elements cross-connected together, with at least N−1 OADM elements of the N OADM elements having secondary DSCMs, satisfied are chromatic dispersion requirements at outputs of the N OADM elements. In an embodiment that has N OADM elements cross-connected together, with all of the N OADM elements having secondary DSCMs, satisfied are both chromatic dispersion and slope of dispersion requirements at outputs of the N OADM elements. In an embodiment that has N OADM elements cross-connected together each including an accurate input DSCM and an accurate output DSCM but no secondary DSCMs, satisfied are both chromatic dispersion and slope of dispersion requirements at outputs of the N OADM elements.

Multiplexing and Eliminating Effects of Cross-Talk

In some embodiments of the invention dead-bands are introduced in the input WDM optical signals by limiting channel frequencies at which optical signals are produced by, for example, optical transmitters within the N optical systems. In one embodiment of the invention, the input WDM optical signals carry dead-bands and are de-multiplexed into eight optical path signals each having four channels as shown at 201, 202, 203, 204, 205, 206, 207 and 208 in FIG. 2A. For example, at 201, channels 1, 2, 3, and 4 are grouped into a one of the eight optical path signals while, at 202, channels 5, 6, 7 and 8 are grouped into another one of the eight optical path signals. There are either two or four dead-bands between any two concurrent optical path signals as shown at 211, 212, 213, 214, 215, 216 and 217 in FIG. 2A. Dead-bands are placed between concurrent optical path signals to mitigate filtering penalties in de-multiplexing the input WDM optical signals from the first and second optical systems and avoid cross-talk (or MPI) between the optical path signals due to a finite roll-off over a range of wavelengths. The number of required dead-bands placed between the concurrent optical path signals depends on the roll-off. A sharp roll-off which is achieved with more expensive MUXs and DeMUXs requires fewer dead-bands whereas a more gradual roll-off obtained from less expensive MUXs and DeMUXs requires a greater number of dead-bands to avoid crosstalk. In another embodiment of the invention, there are more than four channels per optical path signal resulting in fewer optical components and an increased spectral efficiency when there is a need for dead-bands. In yet another embodiment of the invention, there are fewer than four channels per optical path signal resulting in more flexibility and a decreased penalty due to equalization.

Figure 2B:
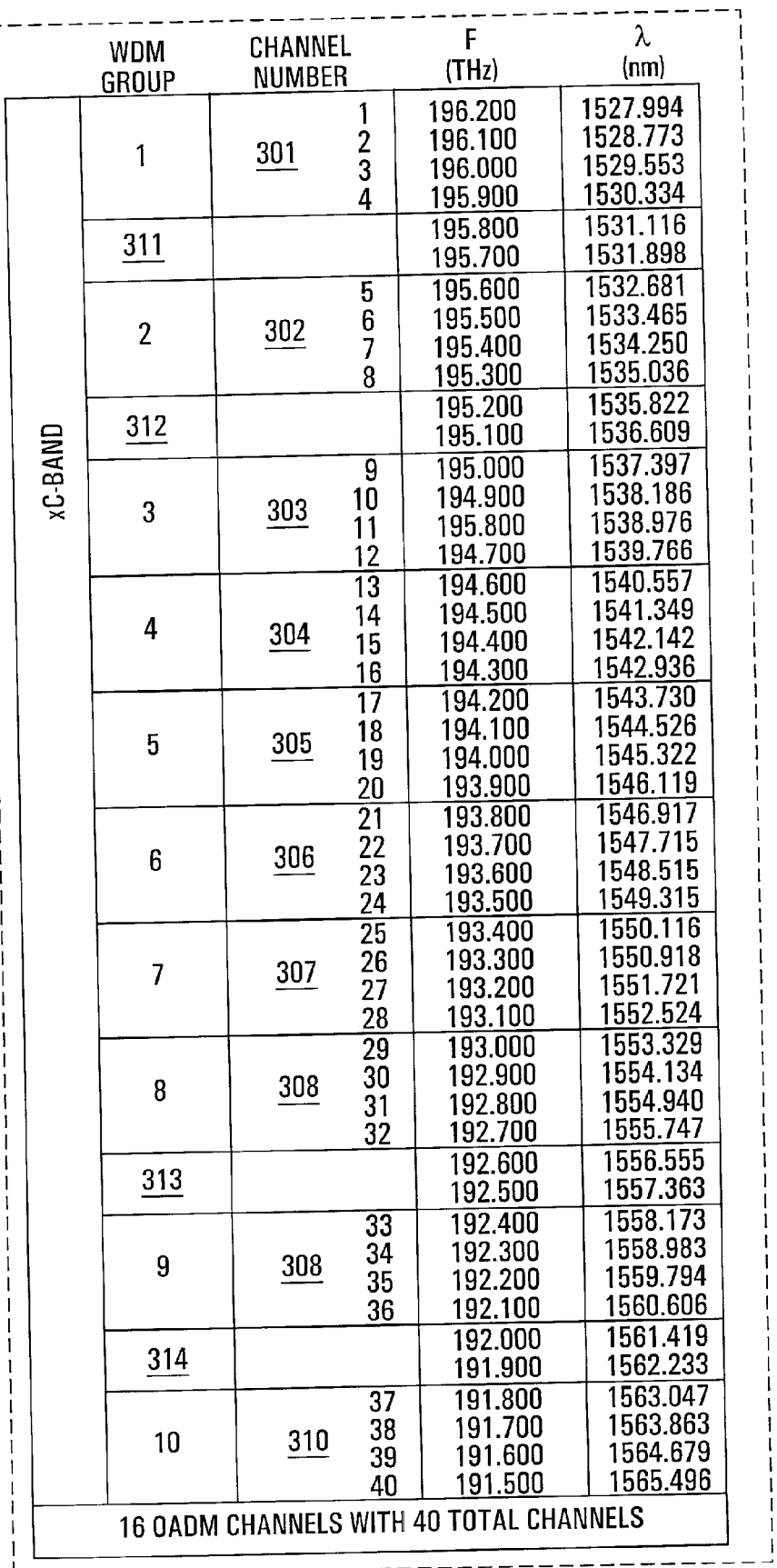
FIG. 2B is a list describing another way an input WDM optical signal is partially de-multiplexed into a number of partially de-multiplexed optical path signals.

FIG. 2B shows an arrangement of another embodiment of the invention at 301 in which some concurrent optical path signals have no dead bands between them. Dead-bands at 311, 312, 313 and 314 exist between concurrent optical path signals at 301 and 302, between concurrent optical path signals at 302 and 303, between concurrent optical path signals at 308 and 309, and between concurrent optical path signals at 309 and 310, respectively. There are no dead-bands between concurrent optical path signals at 303 and 304, between concurrent optical path signals at 304 and 305, between concurrent optical path signals at 305 and 306, between concurrent optical path signals at 306 and 307, and between concurrent optical path signals at 307 and 308. Embodiments of the invention are not limited to eight optical path signals per OADM element. In other embodiments the input WDM optical signals of the first and second optical systems are each de-multiplexed into a number of optical path signals. For example, as shown at 301 to 310, in another embodiment of the invention the input WDM optical signals of the first and second optical systems are each multiplexed into ten optical path signals.

In another embodiment of the invention, the input WDM optical signals from the first and second optical systems are de-multiplexed into distinct groups with each group having a distinct number of channels to suit particular cross-connection requirements.

Eliminating Effects of Cross-Talk

Numerous modifications and variations of the present invention are possible in light of the above teachings. It is therefore to be understood that within the scope of the appended claims, the invention may be practiced otherwise than as specifically described herein.

We claim:

1. A method of implementing programmable optical add/drop multiplexing, the method comprising;
    de-multiplexing, for each one of N optical systems, a respective input WDM (wavelength division multiplexed) optical signal into a plurality of optical path signals each comprising at least one channel;
    performing at least one of chromatic dispersion compensation, slope of dispersion compensation and amplitude compensation on each of the optical paths signals, said compensation being independently determined for each of the optical path signals:
    performing an add/drop function of selected ones of the compensated optical path signals and establishing through paths of remaining ones of the compensated optical path signals; and
    multiplexing, for each one of the N optical systems, a plurality of optical path signals into an output WDM optical signal;
    such that each of the optical path signals for each of the N optical signals can be independently compensated to reach a respective target value, and each said respective target value is independent of whether the optical path signal is selected for performance of an add/drop function or for establishment of a through path.

2. A method according to claim 1 wherein the input WDM optical signals each carry a plurality of dead-bands in a manner that channels of concurrent optical path signals of the optical path signals are separated by a respective one or more of the plurality of dead-bands, thereby resulting in mitigation of filtering penalties in de-multiplexing the input WDM optical signals and reducing cross-talk between the concurrent optical path signals.

3. A method according to claim 1 comprising performing amplitude compensation, wherein for each one of the output WDM optical signals of the N optical systems the power corresponds to target values which are suitable for transmission requirements of a respective one of the N optical systems and independent of the add/drop function.

4. A method according to claim 3 wherein the performing amplitude compensation comprises performing amplification of each one of the input WDM optical signals of the N optical systems, wherein the power of each one of the input WDM optical signals of the N optical systems is set to a common value.

5. A method according to claim 3 wherein the performing amplitude compensation comprises performing amplification of each one of the output WDM optical signals of the N optical systems, wherein for each one of the output WDM optical signals of the N optical systems, the power is set to a target value which is suitable for transmission requirements of a respective one of the N optical systems.

6. A method according to claim 3 wherein the performing amplitude compensation comprises performing amplitude compensation of at least one of the optical path signals of each one of the N optical systems, wherein for respective ones of the optical path signals of the N optical systems the power is set to a specific common value.

7. A method of implementing programmable optical add/drop multiplexing, the method comprising;
    de-multiplexing, for each one of N optical systems, a respective input WDM optical signal into a plurality of optical path signals each comprising at least one channel;
    multiplexing, for each one of the N optical systems, a plurality of optical path signals into an output WDM optical signal;
    performing chromatic dispersion compensation, wherein for each one of the output WDM optical signals of the N optical systems, the chromatic dispersion corresponds to a target value which is suitable for transmission requirements of a respective one of the N optical systems; and
    performing an add/drop function of selected ones of the compensated optical path signals and establishing through paths of remaining ones of the compensated optical path signals;
    such that each of the optical path signals for each of the N optical signals can be independently compensated to reach a respective target value, and each said respective target value is independent of whether the optical path signal is selected for performance of an add/drop function or for establishment of a through path.

8. A method according to claim 7 wherein the performing chromatic dispersion compensation comprises performing preliminary chromatic dispersion compensation and slope of dispersion compensation for each one of the input WDM optical signals of the N optical systems, wherein the input WDM optical signals are set to have common values of chromatic dispersion and slope of dispersion.

9. A method according to claim 7 wherein the performing chromatic dispersion compensation comprises performing output chromatic dispersion compensation and slope of dispersion compensation for at least one of the output WDM optical signals of the N optical systems, wherein for the at least one of the output WDM optical signals of the N optical systems the chromatic dispersion and the slope of dispersion are set to have target values of chromatic dispersion and slope of dispersion, respectively, which are suitable for transmission requirements of a respective one of the N optical systems.

10. A method according to claim 7 wherein the performing chromatic dispersion compensation comprises performing secondary chromatic dispersion and slope of dispersion compensation for at least one optical path signal of each one of at least N−1 optical systems of the N optical systems, wherein respective optical path signals of the N−1 optical systems are set to have common values of chromatic dispersion and slope of dispersion.

11. A method according to claim 7 wherein the performing chromatic dispersion compensation comprises performing secondary chromatic dispersion and slope of dispersion compensation for at least one optical path signal of each of the input WDM optical signals of the N optical systems, wherein the chromatic dispersions and slopes of dispersion of the at least one optical path signal of each one of the input WDM optical signals of the N optical systems are set to have common values of chromatic dispersion and slope of dispersion.

12. A programmable optical add/drop multiplexer (OADM) comprising:
two or more OADM elements wherein each one of the OADM elements comprises a de-multiplexer (DeMUX) and a multiplexer (MUX) connected through a plurality of paths, wherein the DeMUX is adapted to de-multiplex an input WDM optical signal into a plurality of optical path signals each propagating through a respective one of the paths, and wherein the MUX is adapted to multiplex a plurality of optical path signals into an output WDM optical signal;
a plurality of switches each connected to respective ones of the paths of the two or more OADM elements, wherein the switches are adapted to perform an add/drop function of selected ones of the optical path signals of the two or more OADM elements and establish through paths of remaining ones of the optical path signals of the two or more OADM elements; and
at least one of a plurality of dispersion and slope of dispersion compensation modules (DSCMs), a plurality of optical amplifiers and a plurality of variable gain control elements (VGCEs), wherein the DSCMs are adapted to perform at least one of dispersion compensation and slope of dispersion compensation in a manner that, for each one of the two or more OADM elements, the dispersion and slope of dispersion, respectively, of the output WDM optical signal is independent of the state of the switches and wherein the optical amplifiers and the VGCEs are adapted to perform amplitude compensation in a manner that, for each one of the two or more OADM elements, the amplitude of the output WDM optical signal is independent of the state of the switches such that each of the optical path signals for each of the two or more OADM elements can be independently compensated to reach a respective target value, and each said respective target value is independent of whether the optical path signal is selected for performance of an add/drop function or for establishment of a through path.

13. A programmable OADM comprising:
two or more OADM elements wherein each one of the OADM elements comprises a DeMUX and a MUX connected through a plurality of paths, wherein the DeMUX is adapted to de-multiplex an input WDM optical signal into a plurality of optical path signals each propagating through a respective one of the paths, and wherein the MUX is adapted to multiplex a plurality of optical path signals into an output WDM optical signal;
a plurality of switches each connected to respective ones of the paths of the two or more OADM elements, wherein the switches are adapted to perform add/drop function of selected ones of the optical path signals of the two or more OADM elements and establish through paths of remaining ones of the optical path signals of the two or more OADM elements;
optical path length means for reducing effects of coherent cross-talk between the optical path signals; and
means for chromatic dispersion compensation connected to at least one of the two or more OADM elements, wherein the chromatic dispersion of each one of the output WDM signals corresponds to a respective target value and is independent of the state of the switches such that each of the optical path signals for each of the two or more OADMs can be independently compensated to reach a respective target value, and each said respective target value is independent of whether the optical path signal is selected for performance of an add/drop function or for establishment of a through path.

14. A programmable OADM according to claim 13 wherein the optical path means for reducing effects of coherent cross-talk comprises applying the programmable OADM to input WDM optical signals each carrying a plurality of dead-bands in a manner that channels of concurrent optical path signals of the optical path signals are separated by a respective one or more of the plurality of dead-bands, thereby resulting in mitigation of filtering penalties in de-multiplexing the input WDM optical signals and reducing coherent cross-talk between the concurrent optical path signals.

15. A programmable OADM according to claim 13 wherein the means for chromatic dispersion compensation comprises, for each one of the two or more OADM elements, a primary DSCM connected to a respective one of the DeMUXs, wherein the primary DSCM is adapted to perform chromatic dispersion and slope of dispersion compensation of a respective one of the input WDM optical signals, wherein the chromatic dispersion and slope of dispersion of each one of the input WDM optical signals is set to a common value of chromatic dispersion and slope of dispersion, respectively.

16. A programmable OADM according to claim 13 wherein the means for chromatic dispersion compensation comprises, for at least one of the two or more OADM elements, an output DSCM connected to a respective one of the MUXs, wherein the output DSCM is adapted to perform chromatic dispersion compensation of a respective one of the output WDM optical signals, wherein the chromatic dispersion of the respective one of the output WDM optical signals is set to a respective target value of chromatic dispersion.

17. A programmable OADM according to claim 16 wherein the output DSCM is further adapted to perform slope of dispersion compensation of the respective one of the output WDM optical signals, wherein the slope of dispersion of the respective one of the output WDM optical signals is set to a respective target value of slope of dispersion.

18. A programmable OADM according to claim 13 wherein the means for chromatic dispersion compensation comprises one or more secondary DSCMs each connected through a respective one of paths of all but one of the two or more OADM elements, wherein each one of the secondary DSCMs is adapted to perform secondary chromatic dispersion compensation of a respective one of the optical path signals, wherein the chromatic dispersion of the respective one of the optical path signals is set to a value which is equal to a value of chromatic dispersion of a respective optical path signal of a remaining one of the two or more OADM elements.

19. A programmable OADM according to claim 13 wherein the means for chromatic dispersion compensation comprises one or more secondary DSCMs in each one of the two or more OADM elements, wherein the secondary DSCMs are connected through a respective one of the paths and wherein the secondary DSCMs are adapted to perform secondary chromatic dispersion and slope of dispersion compensation of respective ones of the optical path signals, wherein the chromatic dispersion and slope of dispersion of the respective ones of the optical path signals are set to common values of chromatic dispersion and slope of dispersion, respectively.

20. A programmable OADM according to claim 13 comprising means for amplitude compensation, wherein the power of the output WDM signals of the two or more OADM elements is independent of the state of the switches.

21. A programmable OADM according to claim 20 wherein the means for amplitude compensation comprises, for each one of the two or more OADM elements, an input amplifier connected to a respective one of the DeMUXs, wherein the input amplifier is adapted to amplify a respective one of the input WDM optical signals, wherein the powers of the input WDM optical signals are set to a common value.

22. A programmable OADM according to claim 20 wherein the means for amplitude compensation comprises, for each one of the two or more OADM elements, an output amplifier connected to a respective one of the MUXs, wherein the output amplifier is adapted to amplify a respective one of the output WDM optical signals to a required target value of power that satisfies transmission requirements of an optical system associated with a respective one of the two or more OADM elements.

23. A programmable OADM according to claim 20 wherein the means for amplitude compensation comprises a plurality of VGCEs each connected through a respective one of the paths of the two or more OADM elements, each one of the VGCEs being adapted to perform amplitude compensation of a respective one of the optical path signals, wherein the powers of the respective ones of the optical path signals are set to a common value.

24. A programmable OADM according to claim 23 wherein at least one of the VGCEs is adapted to perform a mute function of a respective one of the optical path signals.

* * * * *